(12) United States Patent
Lin et al.

(10) Patent No.: US 8,649,797 B2
(45) Date of Patent: Feb. 11, 2014

(54) RESOURCE ALLOCATION APPARATUS, SUBSCRIBER STATION, RESOURCE ALLOCATION METHOD, AND NON-TRANSITORY COMPUTER READABLE MEDIUM

(75) Inventors: Yi-Ting Lin, Yonghe (TW); Tsung-Yu Tsai, Tainan County (TW); Yung-Lan Tseng, Zhongli (TW); Shao-Yu Lien, Kaohsiung (TW); Kwang-Cheng Chen, Taipei (TW); Chih-Chiang Wu, Shalu Township (TW); Kanchei Loa, Taipei (TW)

(73) Assignee: Institute for Information Industry, Taipei (TW)

( * ) Notice: Subject to any disclaimer, the term of this patent is extended or adjusted under 35 U.S.C. 154(b) by 521 days.

(21) Appl. No.: 12/899,159

(22) Filed: Oct. 6, 2010

(65) Prior Publication Data

US 2011/0081914 A1 Apr. 7, 2011

Related U.S. Application Data

(60) Provisional application No. 61/248,885, filed on Oct. 6, 2009, provisional application No. 61/258,625, filed on Nov. 6, 2009, provisional application No. 61/261,692, filed on Nov. 16, 2009.

(51) Int. Cl.
*H04W 72/00* (2009.01)

(52) U.S. Cl.
USPC ........ 455/452.2; 455/451; 455/453; 455/455; 455/432.2; 455/420; 370/328; 370/431

(58) Field of Classification Search
USPC .......... 370/328–338, 431; 455/446, 450, 455, 455/462, 451, 453, 432.2, 420, 432.3, 434, 455/435.1
See application file for complete search history.

(56) References Cited

U.S. PATENT DOCUMENTS

| | | | |
|---|---|---|---|
| 8,160,591 B2* | 4/2012 | Xu et al. | 455/444 |
| 8,254,931 B2* | 8/2012 | Erceg et al. | 455/436 |
| 8,280,387 B2* | 10/2012 | Guvenc et al. | 455/449 |
| 2001/0026546 A1* | 10/2001 | Schieder et al. | 370/338 |
| 2008/0233966 A1* | 9/2008 | Scheim et al. | 455/452.1 |
| 2010/0120438 A1* | 5/2010 | Kone et al. | 455/444 |

\* cited by examiner

*Primary Examiner* — Mahendra Patel
*Assistant Examiner* — Quan M Hua
(74) *Attorney, Agent, or Firm* — Skaar Ulbrich Macari, P.A.

(57) ABSTRACT

The present invention relates to a resource allocation apparatus, subscriber station, resource allocation method, and non-transitory computer readable medium thereof. The resource allocation apparatus may know the unoccupied partition of the wireless network resource and allocate the unoccupied partition to the SS of the femtocell network. Thereby, the SS of the femtocell network will not occupy the same network resource of the macro BS or other femto SS, and interference of between femtocell and macrocell or other femtocell is reduced effectively.

15 Claims, 9 Drawing Sheets

RESOURCE ALLOCATION APPARATUS, SUBSCRIBER STATION, RESOURCE ALLOCATION METHOD, AND NON-TRANSITORY COMPUTER READABLE MEDIUM

PRIORITY

This application claims the benefit of U.S. Provisional Application Ser. No. 61/248,885 filed on Oct. 6, 2009, U.S. Provisional Application Ser. No. 61/258,625 filed on Nov. 6, 2009 and U.S. Provisional Application Ser. No. 61/261,692 filed on Nov. 16, 2009, each of which are incorporated by reference herein in their entirety.

FIELD

The present invention relates to a resource allocation apparatus, subscriber station, resource allocation method, and non-transitory computer readable medium thereof. More particularly, the present invention relates to a resource allocation apparatus, subscriber station, resource allocation method, and non-transitory computer readable medium thereof for interference mitigation.

BACKGROUND

With continuous advancement in science and technology, people are imposing ever higher requirements on communications. Nowadays, more and more importance is being attached to convenience of communications in addition to requirements on quality of communications. Among various communication means, wireless communications are advantageous in that they provide higher mobility by obviating the need of physical communication network wiring. Therefore, mobile products (i.e., mobile stations (MSs)) with wireless communication functionality such as cell phones, notebook computers and the like are getting more and more popularity in recent years and have become the mainstream products in the consumer electronics market.

To avoid the interference between femtocell and macrocell or other femtocell is an open issue today. The current strategy is using TDM or FDM based approach to interlace the used resource of different cell. However, since the number of femtocells in a given area is usually large, the method of interlacing the available resource may become impractical, due to the complexity of scheduling and control. Moreover, because the number of MSs served by a femtocell is typically small, interlacing may not be good to the resource efficiency and make the system utilization small.

Accordingly, an urgent need still exists in the art to provide a solution that can effectively reduce interference of between femtocell and macrocell or other femtocell, so as to improve the communication quality between femtocell and macrocell or other femtocell.

SUMMARY

An objective of certain embodiments of the invention is to provide a resource allocation apparatus adapted for a wireless network comprising a macro base station (BS) and a subscriber station (SS). The macro BS conveys a control message with fractional frequency reuse (FFR) information which indicates a resource allocation state of the wireless network. The resource allocation apparatus communicates with the SS and comprises a storage, a transceiver, and a processor electrically connected to the storage and the transceiver.

The storage is configured to store a random function and reuse information. The transceiver is configured to receive the control message from the macro BS. The processor is configured to determine an unoccupied partition of the wireless network resource according to the FFR information of the control message, generate an allocation message according to the unoccupied partition of the wireless network resource, the random function and the reuse information. The transceiver is further configured to convey the allocation message to the SS so that the SS proceeds with a data transmission in the wireless network according to the allocation message.

Another objective of certain embodiments of the invention is to provide a resource allocation method for use in a resource allocation apparatus adapted for a wireless network comprising a macro BS and an SS. The macro BS conveys a control message with FFR information, the FFR information indicates a resource allocation state of the wireless network. The resource allocation apparatus communicates with the SS and comprises a storage, a transceiver and a processor electrically connected to the storage and the transceiver. The storage stores a random function and reuse information.

The resource allocation method comprises the steps of: enabling the transceiver to receive the control message from the macro BS; enabling the processor to determine an unoccupied partition of the wireless network resource according to the FFR information of the control message; enabling the processor to generate an allocation message according to the unoccupied partition of the wireless network resource, the random function and the reuse information; and enabling the transceiver to convey the allocation message to the SS so that the SS proceeds with a data transmission in the wireless network according to the allocation message.

Yet a further objective of certain embodiments of the invention is to provide a non-transitory computer readable medium storing a computer program for causing a resource allocation apparatus adapted for a wireless network to execute a resource allocation method when the computer program is loaded into the resource allocation apparatus. The wireless network comprises a macro BS and an SS, the macro BS conveys a control message with FFR information. The FFR information indicates a resource allocation state of the wireless network. The resource allocation apparatus communicates with the SS and comprises a storage, a transceiver and a processor electrically connected to the storage and the transceiver. The storage stores a random function and reuse information.

The computer program comprising: a code A for enabling the transceiver to receive the control message from the macro BS; a code B for enabling the processor to determine an unoccupied partition of the wireless network resource according to the FFR information of the control message; a code C for enabling the processor to generate an allocation message according to the unoccupied partition of the wireless network resource, the random function and the reuse information; and a code D for enabling the transceiver to convey the allocation message to the SS so that the SS proceeds with a data transmission in the wireless network according to the allocation message.

Another objective of certain embodiments of the invention is to provide a subscriber station for use in a femtocell network. The SS comprises a receiving interface and a processor electrically connected to the receiving interface. The receiving interface is configured to receive a frame of the femtocell network. The processor is configured to blindly decode a first logical frequency resource unit (LRU) of a frequency partition of the frame to obtain an allocation message, determine that the allocation message is relative to the subscriber station, and proceeds with a data transmission in the femtocell network according to the allocation message.

Yet a further objective of certain embodiments of the invention is to provide a resource allocation method for use in a subscriber station adapted for a femtocell network. The subscriber station comprises a receiving interface and a processor electrically connected to the receiving interface. The resource allocation method comprises the steps of: enabling the receiving interface to receive a frame of the femtocell network; enabling the processor to blindly decode a first logical frequency resource unit (LRU) of a frequency partition of the frame to obtain an allocation message; enabling the processor to determine that the allocation message is relative to the subscriber station; and enabling the processor to proceed with a data transmission in the femtocell network according to the allocation message.

Another objective of certain embodiments of the invention is to provide a non-transitory computer readable medium, which stores a computer program for causing a subscriber station adapted for a femtocell network to execute a resource allocation method when the computer program is loaded into the subscriber station. The subscriber station comprises a receiving interface and a processor electrically connected to the receiving interface. The computer program comprises: a code A for enabling the receiving interface to receive a frame of the femtocell network; a code B for enabling the processor to blindly decode a first logical frequency resource unit (LRU) of a frequency partition of the frame to obtain an allocation message; a code C for enabling the processor to determine that the allocation message is relative to the subscriber station; and a code D for enabling the processor to proceed with a data transmission in the femtocell network according to the allocation message.

Yet a further objective of certain embodiments of the invention is to provide a resource allocation apparatus adapted for a wireless network, the wireless network comprises a femto BS. The resource allocation apparatus communicates with the femto BS and comprises a storage, a transceiver and a processor electrically connected to the storage and the transceiver. The storage is configured to store FFR information recording an original cell ID/frequency corresponding relation of an unoccupied partition of the wireless network. The processor is configured to: select a time partition from the unoccupied partition according to the random function and the reuse information; change the original cell ID/frequency corresponding relation to generate a changed cell ID/frequency corresponding relation according to the FFR information; and generate an allocation message according to the time partition and the changed cell ID/frequency corresponding relation, wherein the transceiver is configured to convey the allocation message to the femto BS.

Another objective of certain embodiments of the invention is to provide a resource allocation method for use in a resource allocation apparatus adapted for a wireless network comprising a femto BS. The resource allocation apparatus communicates with the femto BS and comprises a storage, a transceiver and a processor electrically connected to the storage and the transceiver. The storage stores FFR information recording an original cell ID/frequency corresponding relation of an unoccupied partition of the wireless network. The resource allocation method comprises the following steps of: enabling the processor to select a time partition from the unoccupied partition according to the random function and the reuse information; enabling the processor to change the original cell ID/frequency corresponding relation to generate a changed cell ID/frequency corresponding relation according to the FFR information; enabling the processor to generate an allocation message according to the time partition and the changed cell ID/frequency corresponding relation; and enabling the transceiver to convey the allocation message to the femto BS.

Yet a further objective of certain embodiments of the invention is to provide a non-transitory computer readable medium, being stored with a computer program for causing a resource allocation apparatus adapted for a wireless network to execute a resource allocation method when the computer program is loaded into the resource allocation apparatus. The wireless network comprises a femto BS. The resource allocation apparatus communicates with the femto BS and comprises a storage, a transceiver and a processor electrically connected to the storage and the transceiver. The storage stores FFR information recording an original cell ID/frequency corresponding relation of an unoccupied partition of the wireless network. The computer program comprising: a code A for enabling the processor to select a time partition from the unoccupied partition according to the random function and the reuse information; a code B for enabling the processor to change the original cell ID/frequency corresponding relation to generate a changed cell ID/frequency corresponding relation according to the FFR information; a code C for enabling the processor to generate an allocation message according to the time partition and the changed cell ID/frequency corresponding relation; and a code D for enabling the transceiver to convey the allocation message to the femto BS.

Certain embodiments of the present invention provide an interference mitigation architecture which may know the unoccupied partition of the wireless network resource and allocate the unoccupied partition to the SS of the femtocell network. Thereby, interference between femtocell and macrocell or other femtocell is reduced effectively and the communication quality between femtocell and macrocell or other femtocell is improved effectively.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following descriptions, the present invention will be explained with reference to various example embodiments;

nevertheless, these example embodiments are not intended to limit the present invention to any specific environment, example, embodiment, applications, or particular implementations described in these example embodiments. Therefore, descriptions of these example embodiments are only provided for purpose of illustration but not to limit the present invention. It should be appreciated that elements unrelated directly to the present invention are omitted from the example embodiments and the attached drawings.

First, the architecture of the macrocell network will be introduced. Please refer to FIG. 1, which illustrates a macrocell network 1. In view of FIG. 1, the macrocell network 1 comprises a femtocell network 2, a femtocell network 3, a macro base station (BS) 11, a subscriber station (SS) 13 and a SON server 8. The femtocell network 2 comprises a femto BS 21, an SS 23 and an SS 25. The femtocell network 3 comprises a femto BS 31, an SS 33 and an SS 35. The SON server 8 may communicate with the femto BS 21, femto BS 31 and macro BS 11. In general, the macro BS 11 conveys a signal by a larger power than the one of the femto BS 31, the coverage of the macrocell network 1 is wider than the one of the femtocell network 2 or the femtocell network 3. Accordingly, interference between femtocell and macrocell or other femtocell occurs.

Figure 1:
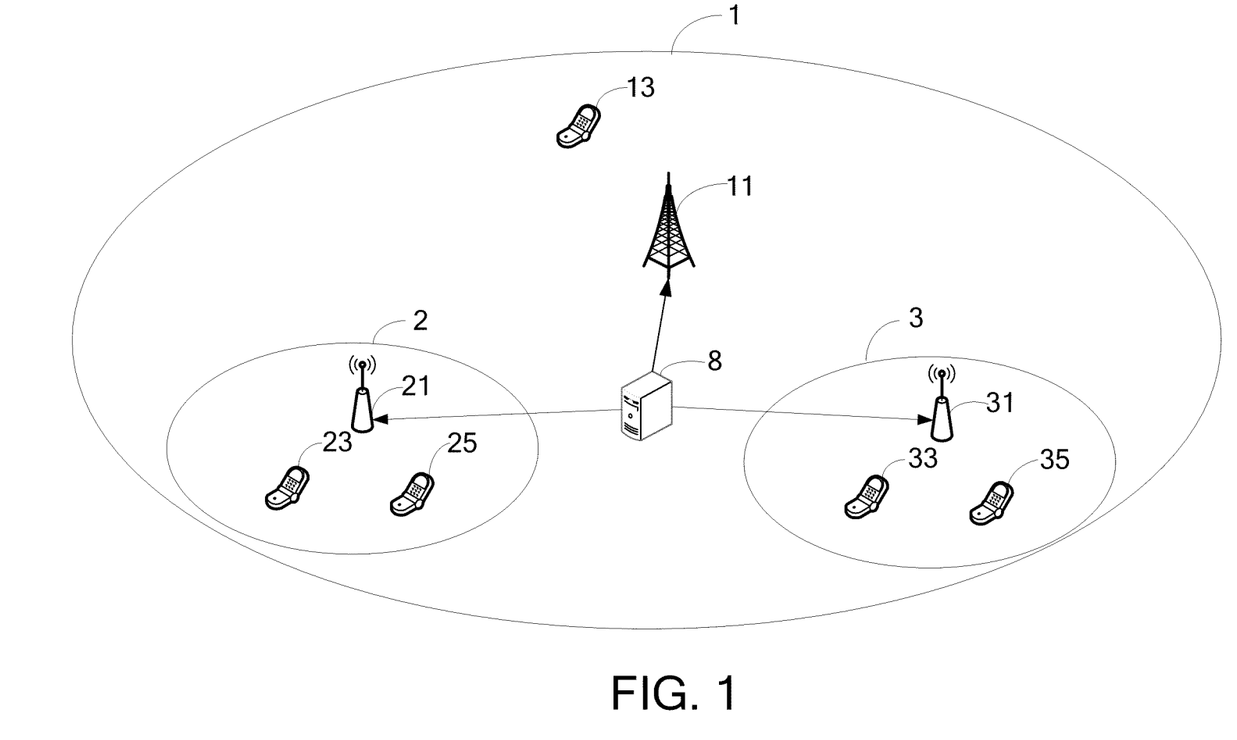
FIG. 1 illustrates a macrocell network according to an example embodiment of the present invention.
Figure 2:
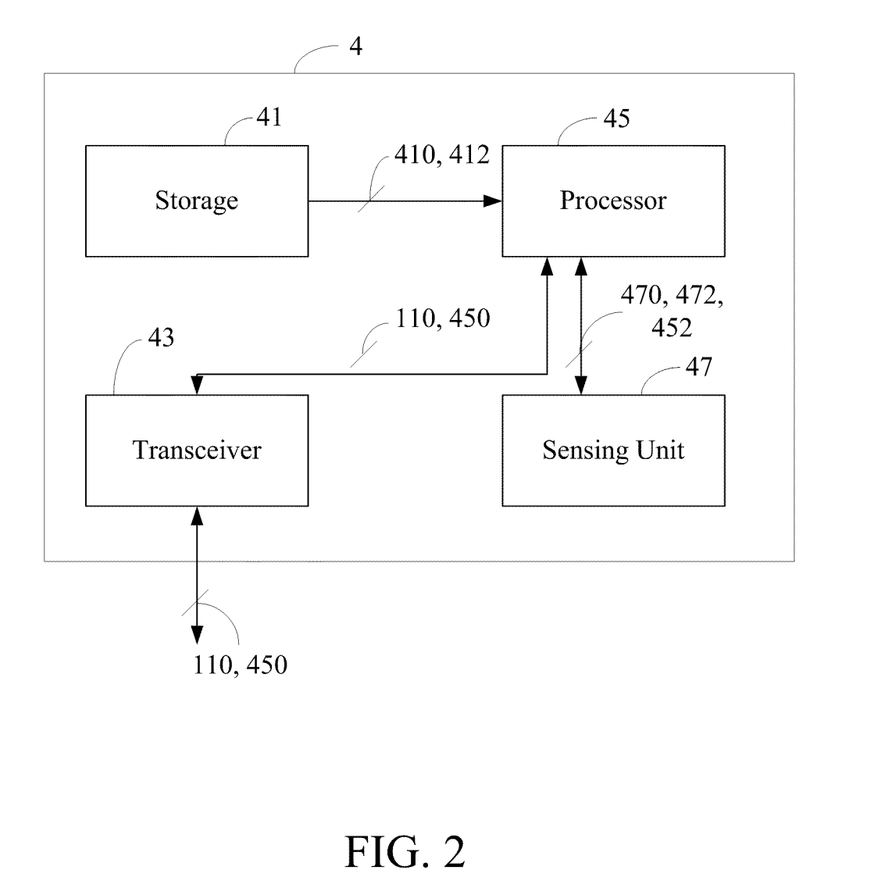
FIG. 2 illustrates a resource allocation apparatus according to an example embodiment of the present invention.

To reduce the above interference effectively, the present invention provides the following solution. A first embodiment of the present invention is shown in FIG. 2, which is a schematic view of a resource allocation apparatus 4. As can be seen from FIG. 1, the resource allocation apparatus 4 comprises a storage 41, a transceiver 43, a processor 45 and a sensing unit 47. The processor 45 is electrically connected to the storage 41, the transceiver 43 and the sensing unit 47. The storage 41 is configured to store a random function 410 and reuse information 412. The reuse information 412 may be Cell IDs, time parameters and reuse factors. It should be noted that in practice, the resource allocation apparatus 4 can be embedded in the femto BS 21, the femto BS 31 or a SON server. In the following description, how to reduce interference effectively will be explained.

Based on the IEEE 802.16m standard, in the macrocell network 1, the macro BS 11 conveys a control message 110 with fractional frequency reuse (FFR) information, wherein the FFR information is configured to indicate a resource allocation state of a wireless network. In this embodiment, the resource includes the time and frequency to be utilized to convey a control message or data, and the resource allocation state is to indicate the occupation state of the joint resource of the macrocell network 1, the femtocell network 2 and the femtocell network 3.

The transceiver 43 is configured to receive the control message 110 with FFR information. After the transceiver 43 receives the control message 110, the processor 45 will determine an unoccupied partition of the wireless network resource according to the FFR information of the control message 110. Specifically, the processor 45 is to find the partition of the wireless network resource, which is not occupied by the macro BS 11 and the SS 13, to avoid that the femtocell network 2 and the femtocell network 3 use the duplicate resource with the macrocell network 1.

After determining the unoccupied partition of the wireless network resource, the processor 45 generates an allocation message 450 according to the unoccupied partition of the wireless network resource, the random function 410 and reuse information 412. Specifically, after realizing the unoccupied partition, the processor 45 will allocate the unoccupied partition of the wireless network resource to the SSs 23, 25, 33 and 35 according to the random function 410 and reuse information 412 to further reduce interference between them. The allocation message 450 is configured to indicate how the unoccupied partition of the wireless network resource is allocated to the SSs 23, 25, 33 and 35. After generating the allocation message 450, the transceiver 43 is further configured to convey the allocation message 450 to the SSs 23, 25, 33 and 3 so that the SSs 23, 25, 33 and 3 may proceed the data transmission in the wireless network according to the allocation message 450.

Particularly, in general, there is a corresponding relation between the cell ID and the frequency of the network resource. In this embodiment, the corresponding relation is called as an original cell ID/frequency corresponding relation, and the original cell ID/frequency corresponding relation of the unoccupied partition is recorded in the FFR information. When the resource allocation apparatus 4 is embedded in the SON server; to reduce interference between the SSs 23, 25, 33 and 35, the processor 45 will select a time partition from the unoccupied partition according to the random function 410 and the reuse information 412. Then, the processor 45 changes the original cell ID/frequency corresponding relation to generate a changed cell ID/frequency corresponding relation according to the FFR information, and generates the allocation message 450 according to the time partition and the changed cell ID/frequency corresponding relation.

In other words, to reduce interference between the SSs 23, 25, 33 and 35, the processor 45 first selects the time partition from the unoccupied partition according to the random function 410 and the reuse information 412, and allocate the selected time partition to the SS 23. Then, the processor 45 further selects other time partitions from the unoccupied partition according to the random function 410 and the reuse information 412, and allocate the selected other time partitions to the SS 25, 33 and 35 respectively.

Otherwise, there is the corresponding relation between the cell ID and the frequency of the network resource, hence the processor 45 must change the original cell ID/frequency corresponding relation to allocate different frequency of the unoccupied partition to the SSs 23, 25, 33 and 35 respectively.

Furthermore, to improve the efficiency of using the unoccupied partition of the wireless network resource, the FFR information records an original resource index of the unoccupied partition. It means that the unoccupied partition is defined as a 2-D map, whose horizontal axis and vertical axis are time and frequency respectively. Each gird of the 2-D map represents a resource unit and is assigned an index, and the set of the indexes is called as the original resource index. To ensure that each of the SSs 23, 25, 33 and 35 obtain different resource units, the processor 45 is further configured to re-index the original resource index according to the random function 410 and the reuse information 412 to generate a new resource index of the unoccupied partition and generate the allocation message 450 according to the new resource index.

On the other hand, when the resource allocation apparatus 4 is embedded in the SON server, the storage 41 is configured to store FFR information recording the original cell ID/frequency corresponding relation of an unoccupied partition of the wireless network. The processor 45 will select a time partition from the unoccupied partition according to the random function 410 and the reuse information 412. Then, the processor 45 changes the original cell ID/frequency corresponding relation to generate a changed cell ID/frequency corresponding relation according to the FFR information, and generates the allocation message 450 according to the time partition and the changed cell ID/frequency corresponding relation. Then, transceiver 43 conveys the allocation message 450 to the femto BS.

Furthermore, when the resource allocation apparatus 4 is embedded in the SON server, to improve the efficiency of using the unoccupied partition of the wireless network resource, the FFR information records an original resource index of the unoccupied partition. It means that the unoccupied partition is defined as a 2-D map, whose horizontal axis and vertical axis are time and frequency respectively. Each gird of the 2-D map represents a resource unit and is assigned an index, and the set of the indexes is called as the original resource index. To ensure that each of the SSs 23, 25, 33 and 35 obtain different resource units, the processor 45 is further configured to re-index the original resource index according to the random function 410 and the reuse information 412 to generate a new resource index of the unoccupied partition and generate the allocation message 450 according to the new resource index. Then, transceiver 43 conveys the allocation message 450 to the femto BS.

Figure 3:
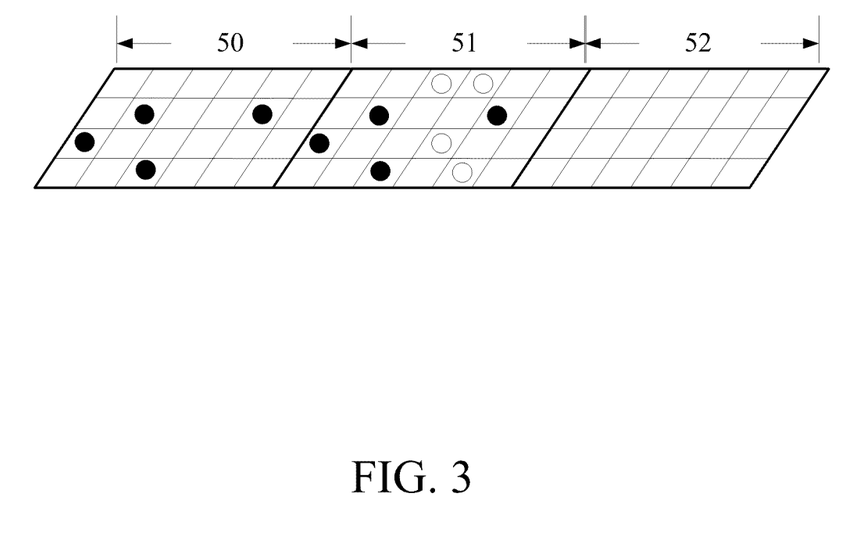
FIG. 3 illustrates three frames in the wireless network according to an example embodiment of the present invention.

Except the above resource allocation ways, the present invention further provides a measurement-based resource allocation. Please refer to FIG. 3, which illustrates three frames (first frame 50, second frame 51 and third frame 52) in the wireless network. In FIG. 3, each grid in the frame represents a resource block (RB), the black circle represents that the RB is occupied by the macro BS 11 or the SS 13, and the white circle represents that the RB is occupied by the device of the femtocell network. The first frame 50 comprises a plurality of first RBs and the second frame 51 comprises a plurality of second RBs. The sensing unit 47 is configured to sense the first frame 50 of the wireless network to obtain a first occupied resource state 470 of the first frame 50. The first occupied resource state 470 is configured to indicate a usage state of the first RBs. It should be noted that the first frame 50 does not convey any data when it is being sensing.

After obtaining the first occupied resource state 470, the processor 45 is further configured to determine an unoccupied resource state of a second frame 51 according to the first occupied resource state 470, and generate the allocation message 450 according to the unoccupied resource state of the second frame 51.

In particular, the processor determines an unoccupied partition of the second RBs according to the first occupied resource state 470 and allocates the unoccupied partition of the second RBs to the SSs 23, 25, 33 and 35 respectively to generate the allocation message 450. In addition, to sensing the frame densely will effect the efficiency of the data transmission because the frame in sensing does not convey any data.

In addition, since the frame in being sensing can not covey any data, a sensing period of the sensing unit 47 influences the efficiency of the data transmission seriously. For example, if the sensing period is too short, the number of the frames for conveying data will slash. If the sensing period is too long, the sensing result can not reflect the actual occupied resource state. To maintain the efficiency of the data transmission, the storage 41 stores a QoS requirement. The processor 45 determines that a constant arrival rate does not fulfill the QoS requirement to generate a period adjustment signal 452. The sensing unit 47 is configured to adjust the sensing period according to the period adjustment signal 452.

In particular, the processor 45 determines whether a constant arrival rate fulfills the QoS requirement according to the following processes. First, the processor 45 calculates the effective bandwidth (denoted as $E_B(\theta)$) of the real-time traffic of the network, wherein $E_B$ represents the effective bandwidth, the smaller $\theta$ implies the network can support a looser QoS requirement and the larger $\theta$ implies the network can support a more strength QoS requirement.

Then, the processor 45 calculates the effective capacity (denoted as $E_C(\theta)$), wherein $E_C$ represents the effective bandwidth capacity, according to the following equations:

$$E_C^1(\theta) = -\frac{1}{\theta}\log(e^{-n\theta})$$

$$E_C^l(\theta) = l\varpi^l E_C^1(l\varpi^l \theta)$$

$$\varpi^l = \frac{T_S-1}{T_S} \cdot \left(1 - \frac{\sum_{g=0}^{\min(l,(1-\eta\varphi)\rho M)} g C_{(1-\eta\varphi)M-g}^{(1-\eta\varphi)\rho M-1}}{l \cdot C_{(1-\eta\varphi)\rho M}^{(1-\eta\varphi)M}}\right)$$

wherein Ts denotes the sensing period, M denotes the number of the resource blocks (RBs) of the frame, $\rho$ denotes the rate of the network resource occupied by the macrocell, $\eta$ denotes the probability which the macrocell continues occupying the occupied RBs, $\phi$ denotes the fraction of correlated RBs allocation of the Macrocell, n denotes the number of the bits carried by one RB, l denotes the number of the RBs desired to be used, and $\bar{\omega}$ denotes the number of the non-interference and usable RB in l RBs. 接

The processor 45 finds the solution of $\theta$ to make $E_B(\theta)=E_C^l(\theta)=\delta$, and derive the delay violation probability by $Pr\{Delay>d_{max}\}=e^{-\theta\delta d_{max}}$. If $e^{-\theta\delta d_{max}}>\epsilon$, l is determined by $$\min_{1\leq l\leq L}\{l\}, \text{ s.t. } e^{-\theta\delta d_{max}} \leq \varepsilon,$$

wherein $\epsilon$ denotes the minimum QoS requirement. If $e^{-\theta\delta d_{max}}\leq\epsilon$, Ts is decreased by one when it is larger than 2.

Figure 4:
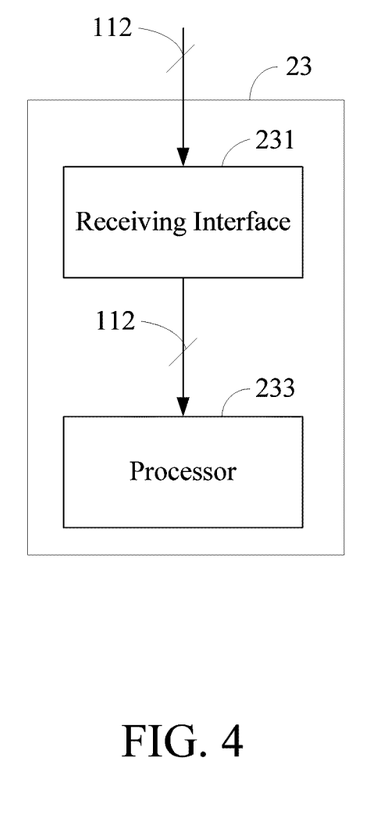
FIG. 4 illustrates a subscriber station according to an example embodiment of the present invention.

Furthermore, to reduce the burden of the resource allocation apparatus 4, the resource allocation apparatus 4 inserts the allocation message 450 into a first logical frequency resource unit (LRU) of a frequency partition of the frame, not convey the allocation message 450 to the SSs 23, 25, 33 and 35. Take the SS 23 as example, please refer to FIG. 4 illustrating the SS 23. In view if FIG. 4, the SS 23 comprises a receiving interface 231 and a processor 233 electrically connected to the receiving interface 231.

The receiving interface 231 of the SS 23 is configured to receive a frame 112 of the femto network. Then, the processor 233 blindly decodes the first LRU of the frequency partition of the frame 112 to obtain the allocation message, determine that the allocation message is relative to the SS 23, and proceeds a data transmission in the femto network according to the allocation message. In other words, the SS 23 will decode the first LRU of the frequency partition of any received frame to ensure that no allocation message is missed.

A second example embodiment of the present invention is shown in FIG. 5A-5D, which are the flow charts of a resource allocation method for use in a resource allocation apparatus of the first embodiment. The resource allocation apparatus is adapted for a wireless network. The wireless network comprises a macro BS and an SS. The macro BS conveys a control message with FFR information indicating a resource allocation state of the wireless network. The resource allocation apparatus communicates with the SS and comprises a storage, a transceiver and a processor electrically connected to the storage and the transceiver. The storage stores a random function and reuse information.

Furthermore, the resource allocation method described in the second embodiment may be implemented by a non-transitory computer readable medium. When the non-transitory computer readable medium is loaded into the resource allocation apparatus, a plurality of codes contained in the non-transitory computer readable medium is executed, the resource allocation method described in the second embodiment can be accomplished. This non-transitory computer readable medium may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

Figure 5A:
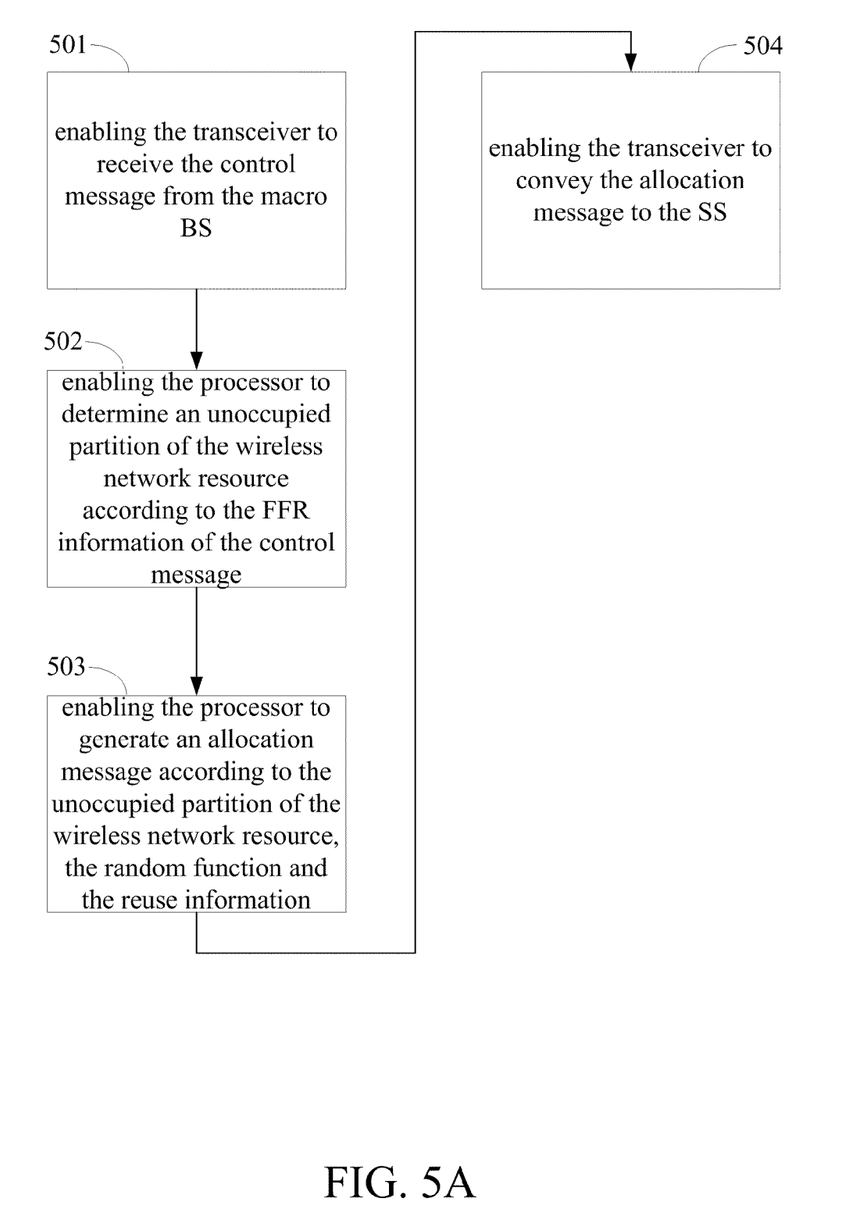
FIGS. 5A-5D illustrate a resource allocation method for use in a resource allocation apparatus according to an example embodiment of the present invention.

Please refer to FIG. 5A first, step 501 is executed to enable the transceiver to receive the control message from the macro BS. Step 502 is executed to enable the processor to determine an unoccupied partition of the wireless network resource according to the FFR information of the control message. Step 503 is executed to enable the processor to generate an allocation message according to the unoccupied partition of the wireless network resource, the random function and the reuse information. Finally, step 504 is executed to enable the transceiver to convey the allocation message to the SS so that the SS proceeds a data transmission in the wireless network according to the allocation message.

Figure 5B:
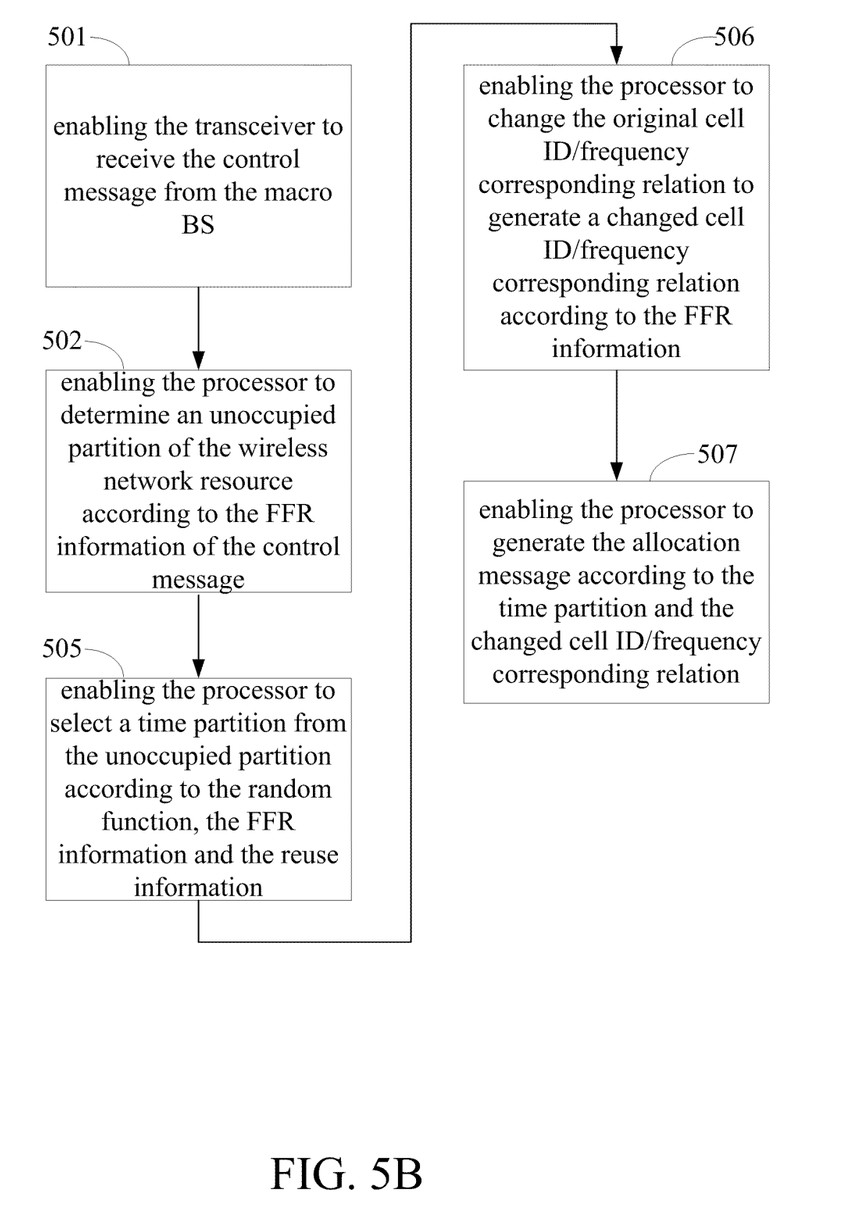

When the FFR information further records an original cell ID/frequency corresponding relation of the unoccupied partition, steps 503-504 may be replaced by steps 505-507 shown in FIG. 5B. After steps 501 and 502 are executed, step 505 is executed to enable the processor to select a time partition from the unoccupied partition according to the random function and the reuse information. Then, step 506 is executed to enable the processor to change the original cell ID/frequency corresponding relation to generate a changed cell ID/frequency corresponding relation according to the FFR information. Finally, Step 507 is executed to enabling the processor to generate the allocation message according to the time partition and the changed cell ID/frequency corresponding relation.

Figure 5C:
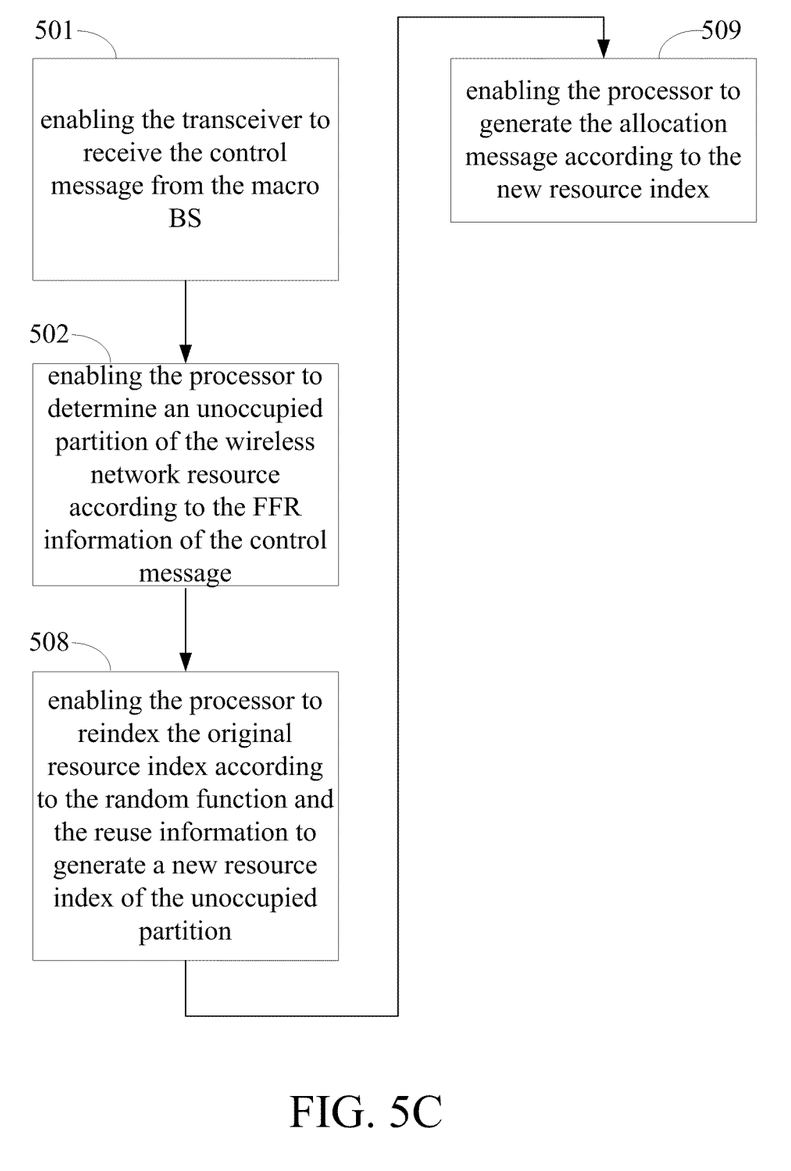

When the FFR information further records an original resource index of the unoccupied partition, steps 503-504 may be replaced by steps 508-509 shown in FIG. 5C. After steps 501 and 502 are executed, step 508 is executed to enable the processor to reindex the original resource index according to the random function and the reuse information to generate a new resource index of the unoccupied partition. Then, step 509 is executed to enable the processor to generate the allocation message according to the new resource index.

It should be noted that when the resource allocation apparatus is embedded in the SON server, the storage is configured to store FFR information recording the original cell ID/frequency corresponding relation of an unoccupied partition of the wireless network. Then, step 506 is executed to enable the processor to change the original cell ID/frequency corresponding relation to generate a changed cell ID/frequency corresponding relation according to the FFR information. Finally, Step 507 is executed to enabling the processor to generate the allocation message according to the time partition and the changed cell ID/frequency corresponding relation.

When the resource allocation apparatus is embedded in the SON server and the FFR information further records an original resource index of the unoccupied partition, steps 503-504 may be replaced by steps 508-509 shown in FIG. 5C. After steps 501 and 502 are executed, step 508 is executed to enable the processor to reindex the original resource index according to the random function and the reuse information to generate a new resource index of the unoccupied partition. Then, step 509 is executed to enable the processor to generate the allocation message according to the new resource index.

Figure 5D:
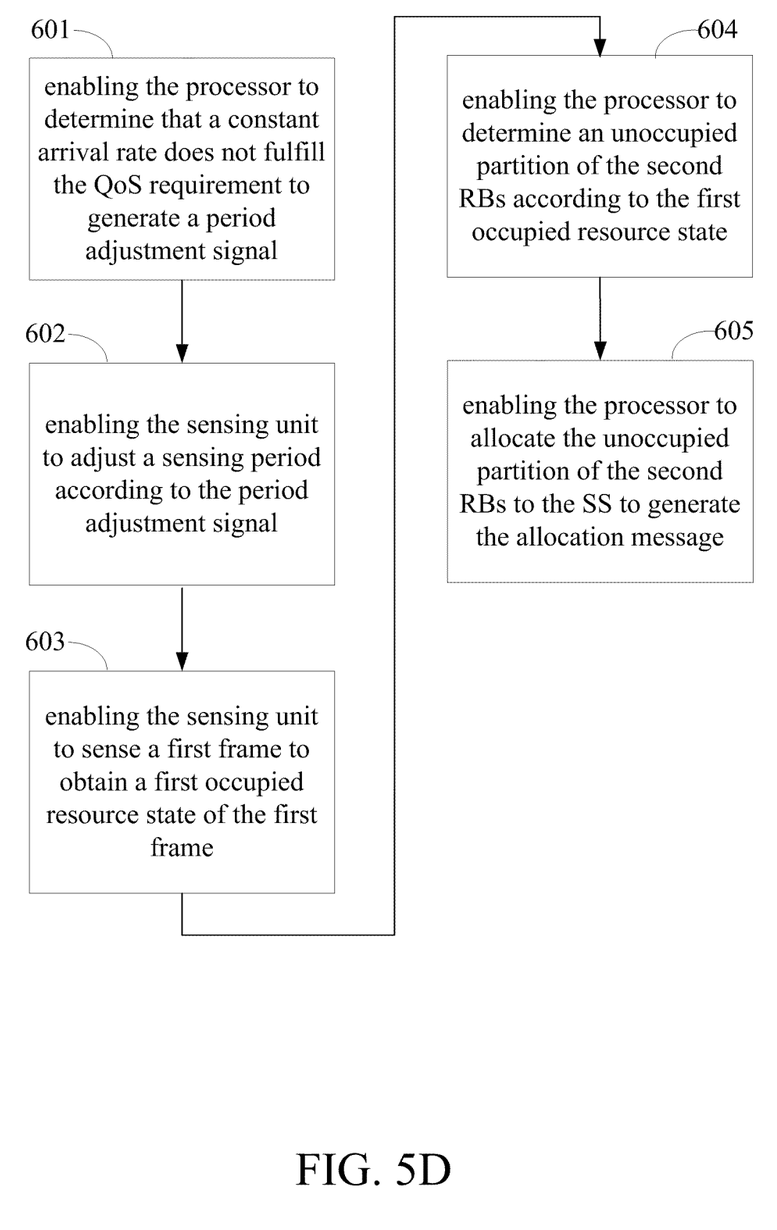

When the resource allocation apparatus further comprises a sensing unit being electrically connected to the processor, the storage further stores a QoS requirement. A first frame comprises a plurality of first RBs and a second frame comprises a plurality of second RBs, and the first occupied resource state is configured to indicate an usage state of the first RBs. The present invention further provides a measurement-based resource allocation method except the above resource allocation methods.

Please refer to FIG. 5D, step 601 is executed to enable the processor to determine that a constant arrival rate does not fulfill the QoS requirement to generate a period adjustment signal. Step 602 is executed to enable the sensing unit to adjust a sensing period according to the period adjustment signal.

Then, step 603 is executed to enable the sensing unit to sense a first frame to obtain a first occupied resource state of the first frame. Step 604 is executed to enable the processor to determine an unoccupied partition of the second RBs according to the first occupied resource state. Step 605 is executed to enable the processor to allocate the unoccupied partition of the second RBs to the SS to generate the allocation message.

In addition to the aforesaid steps, the second embodiment can also execute all the operations and functions set forth in the first embodiment. How the second embodiment executes these operations and functions will be readily appreciated by those of ordinary skill in the art based on the explanation of the first embodiment, and thus will not be further described herein.

Figure 6:
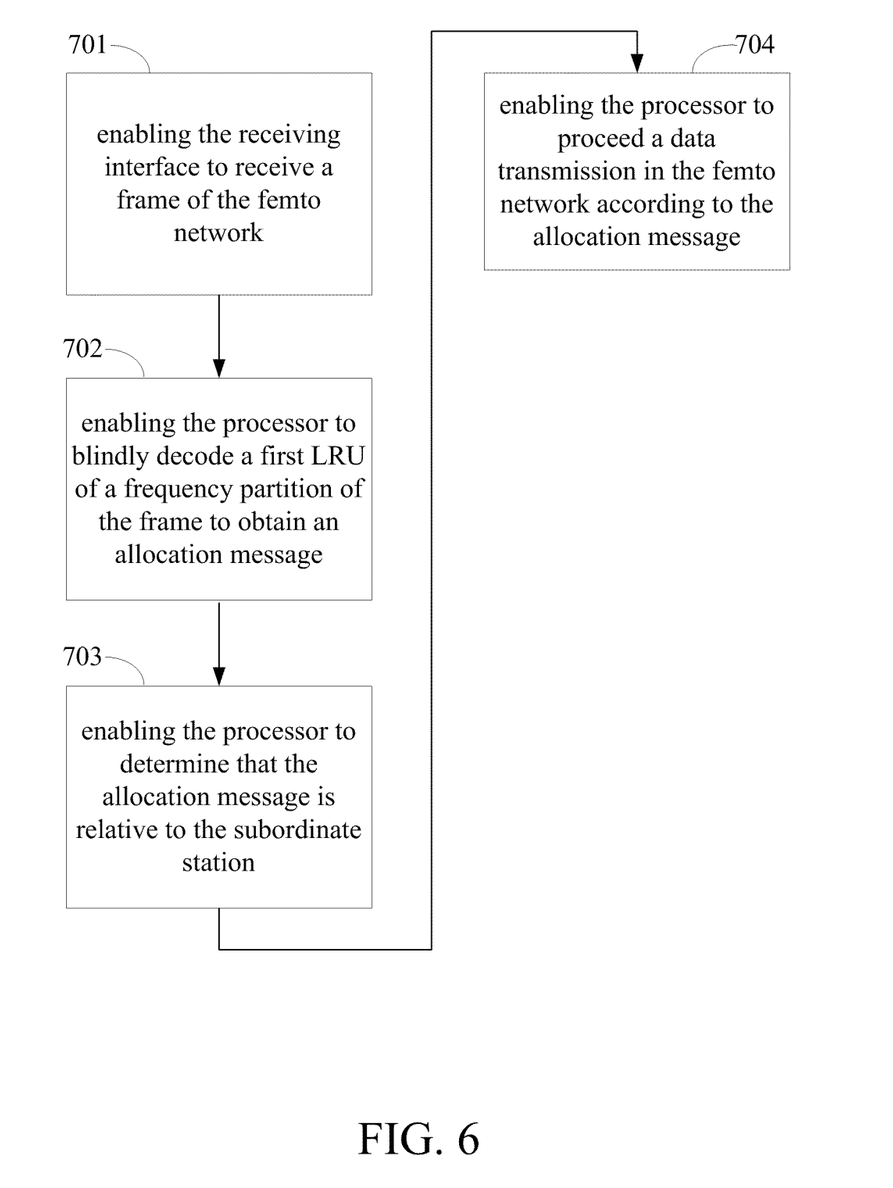
FIG. 6 illustrates a resource allocation method for use in a subscriber station according to an example embodiment of the present invention.

Furthermore, to reduce the burden of the resource allocation apparatus, the resource allocation apparatus inserts the allocation message into a first LRU of a frequency partition of the frame, not convey the allocation message to the SS. A third embodiment is shown in FIG. 6, which is the flow chart of a resource allocation method for use in a subscriber station adapted for a femto network of the first embodiment. The SS comprises a receiving interface and a processor electrically connected to the receiving interface.

Furthermore, the resource allocation method described in the third embodiment may be implemented by a non-transitory computer readable medium. When the non-transitory computer readable medium is loaded into the SS, a plurality of codes contained in the non-transitory computer readable medium is executed, the resource allocation method described in the third embodiment can be accomplished. This non-transitory computer readable medium may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

First, step 701 is executed to enable the receiving interface to receive a frame of the femto network. Step 702 is executed to enable the processor to blindly decode a first LRU of a frequency partition of the frame to obtain an allocation message. Step 703 is executed to enable the processor to determine that the allocation message is relative to the subscriber station. Finally, step 704 is executed to enable the processor to proceed a data transmission in the femto network according to the allocation message.

In addition to the aforesaid steps, the third example embodiment can also execute all the operations and functions set forth in the first embodiment. How the third embodiment executes these operations and functions will be readily appreciated by those of ordinary skill in the art based on the explanation of the first embodiment, and thus will not be further described herein.

The present invention provides an interference mitigation architecture which may know the unoccupied partition of the wireless network resource and allocate the unoccupied partition to the SS of the femtocell network. Thereby, interference of between femtocell and macrocell or other femtocell is reduced effectively and the communication quality between femtocell and macrocell or other femtocell is improved effectively.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A resource allocation apparatus adapted for a wireless network, the wireless network comprising a macro base station (BS) and a subscriber station (SS), the macro BS conveying a control message with fractional frequency reuse (FFR) information, the FFR information indicating a resource allocation state of the wireless network, the resource allocation apparatus communicating with the SS, the apparatus comprising:
   a storage, being configured to store a random function, reuse information and a QoS requirement;
   a transceiver, being configured to receive the control message from the macro BS;
   a processor, being electrically connected to the storage and configured to determine an unoccupied partition of a wireless network resource according to the FFR information of the control message, generate an allocation message according to the unoccupied partition of the wireless network resource, the random function and the reuse information;
   wherein the transceiver is electrically connected to the processor and further configured to convey the allocation message to the SS so that the SS proceeds a data transmission in the wireless network according to the allocation message;
   a sensing unit electrically connected to the processor and having a sensing period, the processor further determining that a constant arrival rate does not fulfill the QoS requirement to generate a period adjustment signal, the sensing unit being configured to adjust the sensing period of the sensing unit according to the period adjustment signal.

2. The resource allocation apparatus as claimed in claim 1, wherein the FFR information further records an original cell ID/frequency corresponding relation of the unoccupied partition, the processor is further configured to:
   select a time partition from the unoccupied partition according to the random function and the reuse information;
   change the original cell ID/frequency corresponding relation to generate a changed cell ID/frequency corresponding relation according to the FFR information; and
   generate the allocation message according to the time partition and the changed cell ID/frequency corresponding relation.

3. The resource allocation apparatus as claimed in claim 1, wherein the FFR information further records an original resource index of the unoccupied partition, the processor is further configured to reindex the original resource index according to the random function and the reuse information to generate a new resource index of the unoccupied partition and generate the allocation message according to the new resource index.

4. The resource allocation apparatus as claimed in claim 1, wherein the sensing unit further senses a first frame to obtain a first occupied resource state of the first frame according to the sensing period; the processor is further configured to determine an unoccupied resource state of a second frame according to the first occupied resource state, and generate the allocation message according to the unoccupied resource state of the second frame.

5. The resource allocation apparatus as claimed in claim 4, wherein the first frame comprises a plurality of first resource blocks (RBs) and the second frame comprises a plurality of second RBs, the first occupied resource state is configured to indicate an usage state of the first RBs, the processor determines an unoccupied partition of the second RBs according to the first occupied resource state and allocates the unoccupied partition of the second RBs to the SS to generate the allocation message.

6. A resource allocation method for use in a resource allocation apparatus adapted for a wireless network, the wireless network comprising a macro BS and an SS, the macro BS conveying a control message with FFR information, the FFR information indicating a resource allocation state of the wireless network, the resource allocation apparatus communicating with the SS and comprising a storage, a transceiver, a processor electrically connected to the storage and the transceiver, and a sensing unit electrically connected to the processor, the storage storing a random function, reuse information, and a QoS requirement, the sensing unit having a sensing period, the resource allocation method comprising the steps of:
   enabling the transceiver to receive the control message from the macro BS;
   enabling the processor to determine an unoccupied partition of a wireless network resource according to the FFR information of the control message;
   enabling the processor to generate an allocation message according to the unoccupied partition of the wireless network resource, the random function and the reuse information;
   enabling the transceiver to convey the allocation message to the SS so that the SS proceeds a data transmission in the wireless network according to the allocation message;
   enabling the processor to determine that a constant arrival rate does not fulfill the QoS requirement to generate a period adjustment signal; and
   enabling the sensing unit to adjust the sensing period according to the period adjustment signal.

7. The resource allocation method as claimed in claim 6, wherein the FFR information further records an original cell ID/frequency corresponding relation of the unoccupied partition, the resource allocation method further comprises the steps of:
   enabling the processor to select a time partition from the unoccupied partition according to the random function and the reuse information;

enabling the processor to change the original cell ID/frequency corresponding relation to generate a changed cell ID/frequency corresponding relation according to the FFR information; and enabling the processor to generate the allocation message according to the time partition and the changed cell ID/frequency corresponding relation.

8. The resource allocation method as claimed in claim 6, wherein the FFR information further records an original resource index of the unoccupied partition, the resource allocation method further comprises the steps of:

enabling the processor to reindex the original resource index according to the random function and the reuse information to generate a new resource index of the unoccupied partition; and enabling the processor to generate the allocation message according to the new resource index.

9. The resource allocation method as claimed in claim 6, further comprising the steps of:

enabling the sensing unit to sense a first frame to obtain a first occupied resource state of the first frame;

enabling the processor to determine an unoccupied resource state of a second frame according to the first occupied resource state; and enabling the processor to generate the allocation message according to the unoccupied resource state of the second frame.

10. The resource allocation method as claimed in claim 9, wherein the first frame comprises a plurality of first resource blocks (RBs) and the second frame comprises a plurality of second RBs, the first occupied resource state is configured to indicate an usage state of the first RBs, the resource allocation method further comprises the steps of:

enabling the processor to determine an unoccupied partition of the second RBs according to the first occupied resource state; and enabling the processor to allocate the unoccupied partition of the second RBs to the SS to generate the allocation message.

11. A non-transitory computer readable medium, being stored with a computer program for causing a resource allocation apparatus adapted for a wireless network to execute a resource allocation method when the computer program is loaded into the resource allocation apparatus, the wireless network comprising a macro BS and an SS, the macro BS conveying a control message with FFR information, the FFR information indicating a resource allocation state of the wireless network, the resource allocation apparatus communicating with the SS and comprising a storage, a transceiver, a processor electrically connected to the storage and the transceiver, and a sensing unit electrically connected to the processor, the storage storing a random function, reuse information and a QoS requirement, the sensing unit having a sensing period, the computer program comprising:

a code A for enabling the transceiver to receive the control message from the macro BS;

a code B for enabling the processor to determine an unoccupied partition of a wireless network resource according to the FFR information of the control message;

a code C for enabling the processor to generate an allocation message according to the unoccupied partition of the wireless network resource, the random function and the reuse information; and a code D for enabling the transceiver to convey the allocation message to the SS so that the SS proceeds a data transmission in the wireless network according to the allocation message, a code P for enabling the processor to determine that a constant arrival rate does not fulfill the QoS requirement to generate a period adjustment signal; and a code Q for enabling the sensing unit to adjust the sensing period according to the period adjustment signal.

12. The non-transitory computer readable medium as claimed in claim 11, wherein the FFR information further records an original cell ID/frequency corresponding relation of the unoccupied partition, the computer program further comprises:

a code E for enabling the processor to select a time partition from the unoccupied partition according to the random function and the reuse information;

a code F for enabling the processor to change the original cell ID/frequency corresponding relation to generate a changed cell ID/frequency corresponding relation according to the FFR information; and a code G for enabling the processor to generate the allocation message according to the time partition and the changed cell ID/frequency corresponding relation.

13. The non-transitory computer readable medium as claimed in claim 11, wherein the FFR information further records an original resource index of the unoccupied partition, the computer program further comprises:

a code H for enabling the processor to reindex the original resource index according to the random function and the reuse information to generate a new resource index of the unoccupied partition; and a code I for enabling the processor to generate the allocation message according to the new resource index.

14. The non-transitory computer readable medium as claimed in claim 11, further comprising:

a code J for enabling the sensing unit to sense a first frame to obtain a first occupied resource state of the first frame;

a code K for enabling the processor to determine an unoccupied resource state of a second frame according to the first occupied resource state; and a code L for enabling the processor to generate the allocation message according to the unoccupied resource state of the second frame.

15. The non-transitory computer readable medium as claimed in claim 14, wherein the first frame comprises a plurality of first resource blocks (RBs) and the second frame comprises a plurality of second RBs, the first occupied resource state is configured to indicate an usage state of the first RBs, the computer program further comprises:

a code N for enabling the processor to determine an unoccupied partition of the second RBs according to the first occupied resource state; and a code O for enabling the processor to allocate the unoccupied partition of the second RBs to the SS to generate the allocation message.

* * * * *